United States Patent
Wu et al.

(10) Patent No.: US 11,788,458 B2
(45) Date of Patent: Oct. 17, 2023

(54) FUEL SUPPLY SYSTEM FOR ACTIVE PRE-COMBUSTOR

(71) Applicant: GUANGZHOU AUTOMOBILE GROUP CO., LTD., Guangzhou (CN)

(72) Inventors: Jian Wu, Guangzhou (CN); Jingsi Wei, Guangzhou (CN); Shan Wu, Guangzhou (CN); Hanjun Xu, Guangzhou (CN); Guixiang Ma, Guangzhou (CN); Mingjia Liu, Guangzhou (CN)

(73) Assignee: GUANGZHOU AUTOMOBILE GROUP CO., LTD., Guangdong (CN)

( * ) Notice: Subject to any disclaimer, the term of this patent is extended or adjusted under 35 U.S.C. 154(b) by 0 days.

(21) Appl. No.: 17/756,708

(22) PCT Filed: Dec. 28, 2020

(86) PCT No.: PCT/CN2020/140156
§ 371 (c)(1),
(2) Date: May 31, 2022

(87) PCT Pub. No.: WO2022/082998
PCT Pub. Date: Apr. 28, 2022

(65) Prior Publication Data
US 2023/0160334 A1   May 25, 2023

(30) Foreign Application Priority Data
Oct. 20, 2020   (CN) .......................... 202011124960.0

(51) Int. Cl.
*F02B 19/10* (2006.01)
*F02B 19/06* (2006.01)
(Continued)

(52) U.S. Cl.
CPC ............ *F02B 19/109* (2013.01); *F02B 19/06* (2013.01); *F02B 19/12* (2013.01); *F02B 19/16* (2013.01); *F02M 29/00* (2013.01)

(58) Field of Classification Search
CPC ........ F02B 19/109; F02B 19/06; F02B 19/12; F02B 19/16; F02M 29/00
(Continued)

(56) References Cited

U.S. PATENT DOCUMENTS

| 4,091,771 A | 5/1978 | Rapp et al. |
| 4,106,446 A | 8/1978 | Yamada et al. |

(Continued)

FOREIGN PATENT DOCUMENTS

| CN | 201496140 U | 6/2010 |
| CN | 104141526 A | 11/2014 |

(Continued)

OTHER PUBLICATIONS

English Translation of International Search Report for corresponding International Patent Application No. PCT/CN2020/140156 dated Jul. 15, 2021.

*Primary Examiner* — Mahmoud Gimie
(74) *Attorney, Agent, or Firm* — Hodgson Russ LLP

(57) ABSTRACT

A fuel supply system for an active pre-combustor, including a cylinder assembly. The cylinder assembly comprises a cylinder head, a cylinder body, and a piston. The cylinder head, the cylinder body and the piston form a main combustor. The fuel supply system for the active precombustor further includes a precombustion chamber assembly and a plunger air pump assembly. The pre-combustor assembly is communicated with the main combustor. The plunger air pump assembly is communicated with the pre-combustor assembly. The plunger air pump assembly can actively mix air with fuel into a mixed fuel and deliver it into the (Continued)

pre-combustor assembly (20). The fuel supply system for the active pre-combustor supplies the mixed fuel to the pre-combustor on the basis of a reciprocating stroke opposite to the piston by adding the plunger air pump assembly on the pre-combustor assembly, and is safe, reliable, and efficient.

16 Claims, 3 Drawing Sheets

(51) Int. Cl.
*F02B 19/12* (2006.01)
*F02B 19/16* (2006.01)
*F02M 29/00* (2006.01)

(58) Field of Classification Search
USPC .......................................................... 123/275
See application file for complete search history.

(56) References Cited

U.S. PATENT DOCUMENTS

| 2013/0220269 A1* | 8/2013 | Woo ................... F02B 19/1085 123/260 |
| 2016/0230645 A1* | 8/2016 | Schock .............. F02B 19/1052 |
| 2018/0149116 A1 | 5/2018 | Cook |

FOREIGN PATENT DOCUMENTS

| CN | 205243655 U | 5/2016 | |
| EP | 0192219 A2 * | 8/1986 | ............ F02M 26/08 |
| EP | 2362077 A2 | 8/2011 | |
| GB | 2183727 A | 6/1987 | |
| JP | 1976065210 A | 6/1976 | |
| WO | 2017184610 A1 | 10/2017 | |
| WO | 2018130772 A1 | 7/2018 | |

\* cited by examiner

FUEL SUPPLY SYSTEM FOR ACTIVE PRE-COMBUSTOR

CROSS-REFERENCE TO RELATED APPLICATIONS

This application is the 371 application of PCT Application No. PCT/CN2020/140156, filed on Dec. 28, 2020, which is based upon and claims priority to Chinese Patent Application No. 202011124960.0, filed Oct. 20, 2020, the entire contents of which are incorporated herein by reference.

TECHNICAL FIELD

The present application relates to the technical field of vehicle motors, and more particularly, to a fuel supply system for an active pre-combustor.

BACKGROUND

With the development of gasoline engine technology and increasingly strict emission regulations and fuel consumption regulations, traditional gasoline engine technologies have been faced with more severe challenges, and improving a thermal efficiency of gasoline engines while reducing fuel consumption has always been a goal pursued by major manufacturers.

Lean combustion and exhaust gas recirculation (EGR) is one of the effective methods to improve a thermal efficiency of gasoline engines. It can be shown from the existing experimental data that, if a gasoline engine adopts a lean combustion with an excess air coefficient (lambda) between 1 and 1.5, the thermal efficiency may be improved. However, a three-way catalytic converter cannot be adopted due to a deviation from the theoretical air-fuel ratio, and it is required to be adopted expensive NOx after-treatment equipment to meet emission regulations. If the gasoline engine adopts an ultra-lean combustion with an excess air coefficient greater than 1.5, the thermal efficiency of the gasoline engine can be improved without causing excessive NOx emissions. On the other hand, mixed fuel with a high EGR rate (EGR rate>20%) can be used to reduce the pumping loss, reduce the knocking tendency, and improve the thermal efficiency.

However, conventional spark plugs are difficult to ignite ultra-lean gas mixtures or gas mixtures with a high EGR rate, and the combustion of ultra-lean gas mixtures or gas mixtures with high EGR rates requires a high-energy ignition device to meet the application requirements. Therefore, the pre-combustor technology has received widespread attention.

SUMMARY

There is provided a fuel supply system for an active pre-combustor. The technical solution is as below:

According to embodiments of the present disclosure, there is provided a fuel supply system for the active pre-combustor, comprising a main combustor comprising a cylinder head, a cylinder body and a piston; a pre-combustor assembly; and a plunger air pump assembly; wherein the pre-combustor assembly is communicated with the main combustor, and the plunger air pump assembly is communicated with the pre-combustor assembly, and wherein the plunger air pump assembly is capable of mixing air and fuel into mixed fuel and delivering the mixed fuel to the pre-combustor assembly.

DETAILED DESCRIPTION

Specific embodiments of the present application will be described in further detail below with reference to the accompanying drawings and embodiments. The following embodiments are intended to illustrate the present application, but not to limit the scope of the present application.

The terms such as "first", "second", "third" and "fourth" in the description and claims of the present application are used to distinguish similar objects and are not necessarily used to describe a specific order or sequence.

Figure 1:
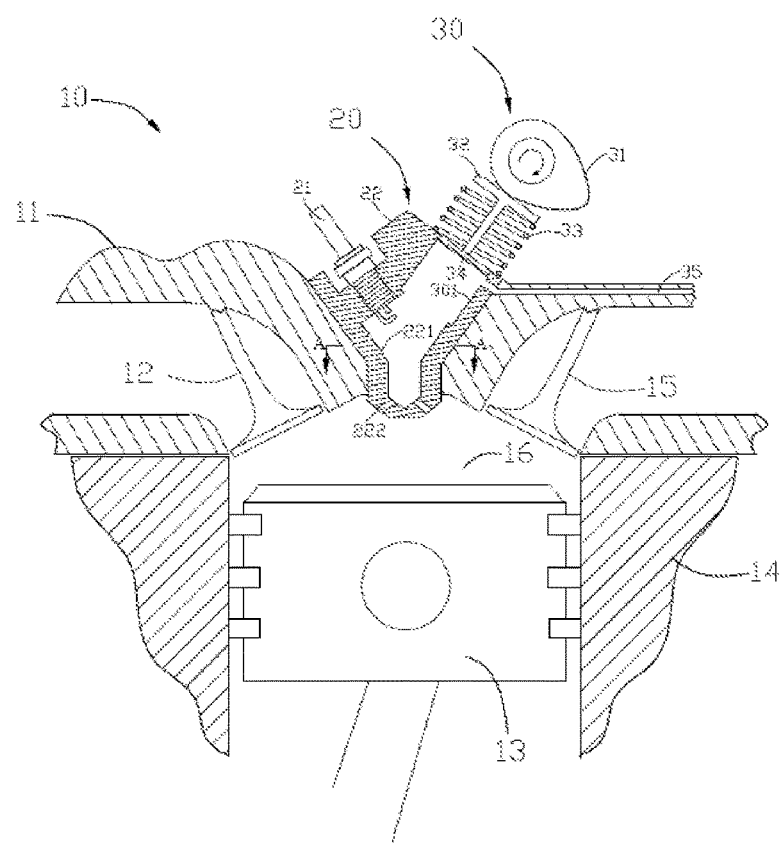
FIG. 1 illustrates a view of a fuel supply system for an active pre-combustor according to the present application.

Referring to FIG. 1, the fuel supply system of the active pre-combustor of the present application includes a cylinder assembly 10, a pre-combustor assembly 20 and a plunger air pump assembly 30. The cylinder assembly 10 includes a main combustor 16, and the main combustor 16 includes a cylinder head 11, a cylinder body 14 and a piston 13. The cylinder assembly 10 further includes an intake valve 15 and an exhaust valve 12 for gas intake and gas exhaust, respectively. The plunger air pump assembly 30 includes a fuel supply pipeline assembly, and the fuel supply pipeline assembly is communicated with an engine and a plunger air pump cavity 301. The pre-combustor assembly 20 is communicated with the main combustor 16, and the plunger air pump assembly 30 is communicated with the pre-combustor assembly 20.

Further, the plunger air pump assembly 30 further includes a plunger air pump driver 31, a plunger air pump rod 32 and a plunger air pump spring 33. The plunger air pump driver 31 is configured to drive the plunger air pump rod 32, and the plunger air pump spring 33 is wound on the plunger air pump rod 32, so that the plunger air pump rod 32 is capable of sliding up and down in the plunger air pump cavity 301 under a driving of the plunger air pump driver 31 and the plunger air pump spring 33. In this embodiment, the plunger air pump rod 32 further includes a plunger air pump piston 34, and the plunger air pump piston 34 is fixedly connected to the bottom end of the plunger air pump rod 32 and is directly driven by the plunger air pump rod 32, which is capable of sliding up and down in the plunger air pump cavity 301 under the driving of the plunger air pump driver 31 and the plunger air pump spring 33. The plunger air pump driver 31 is a cam structure arranged on a valve camshaft. A ratio of a frequency at which the plunger air pump driver 31 drives the plunger air pump rod 32 and a frequency at which the piston 13 drives an engine crankshaft is 1:2. That is, every time the engine crankshaft rotates twice, the plunger air pump driver 31 rotates once. In other embodiments, the ratio of the frequency at which the plunger air pump driver 31 drives the plunger air pump rod 32 and the frequency at which the piston 13 drives the engine crankshaft may also be 1:1 or 2:1, as long as it is ensured that the plunger air pump rod 32 always moves in an opposite direction to the piston 13 or the plunger air pump rod 32 is kept stationary. The plunger air pump driver 31 may be arranged on an independent camshaft independent of the valve camshaft. If required, the plunger air pump driver 31 may also be an electric mechanism, an electromagnetic mechanism or a crank-link mechanism, as long as it can reciprocally drive the plunger air pump rod 32 at a fixed frequency.

Further, the pre-combustor assembly 20 includes a spark plug 21 and a pre-combustor housing 22. The spark plug 21 is fixed on the pre-combustor housing 22, the spark plug 21 is capable of igniting the mixed fuel in the pre-combustor cavity 221. The pre-combustor housing 22 is provided with pre-combustor injection holes 222, and the pre-combustor assembly 20 is communicated with the main combustor 16 through the pre-combustor injection holes 222. The plunger air pump cavity 301 is located in the pre-combustor housing 22 and is formed between the plunger air pump piston 34 and the pre-combustor housing 22. The plunger air pump rod 32 moves up and down along the pre-combustor housing 22, and is capable of controlling the plunger air pump cavity 301 to be communicated with or separated from the pre-combustor cavity 221. In this embodiment, the plunger air pump cavity 301 is cylindrical, and the pre-combustor housing 22 is in a shape of an inverted cone. It can be understood that the shapes of the plunger air pump cavity 301 and the pre-combustor housing 22 may also be designed and arranged according to practical needs of the cylinder body 14. The pre-combustor injection holes 222 are arranged at a bottom of the pre-combustor housing 22, and the plurality of pre-combustor injection holes 222 are evenly arranged along an axis of the pre-combustor housing 22. The spark plug 21 is arranged on one side of a top of the pre-combustor housing 22, and the plunger air pump assembly 30 is arranged on the other side of the top of the pre-combustor housing 22. In this embodiment, mounting angles of the cylinder body 14, the spark plug 21 and the plunger air pump assembly 30 are only illustrated as an example. The plunger air pump assembly 30 may be mounted at any reasonable angle relative to the cylinder body 14 and spark plug 21.

Figure 3:
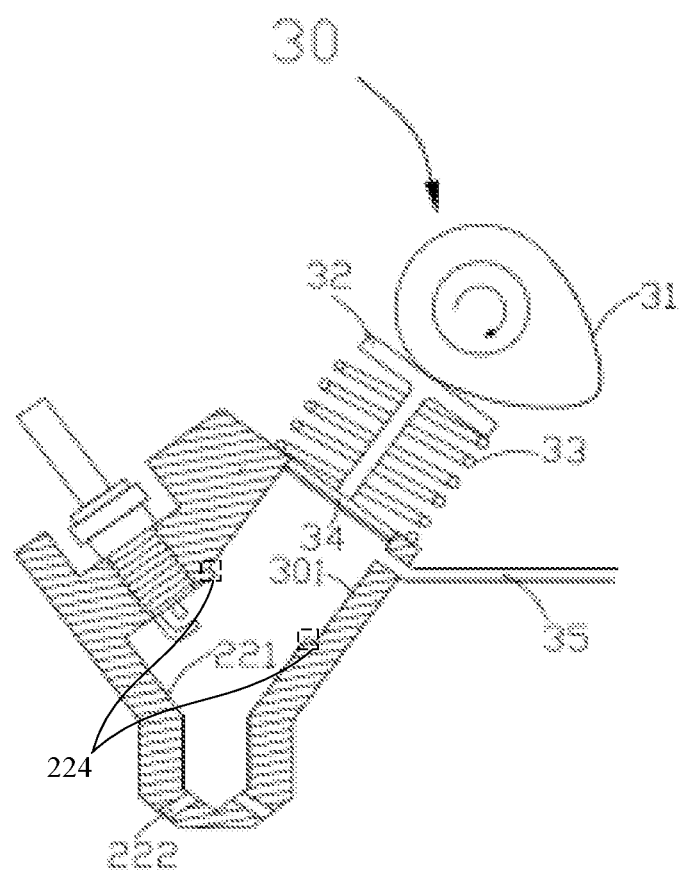
FIG. 3 illustrates a view of a plunger air pump rod at a top dead center according to the present application.
Figure 4:
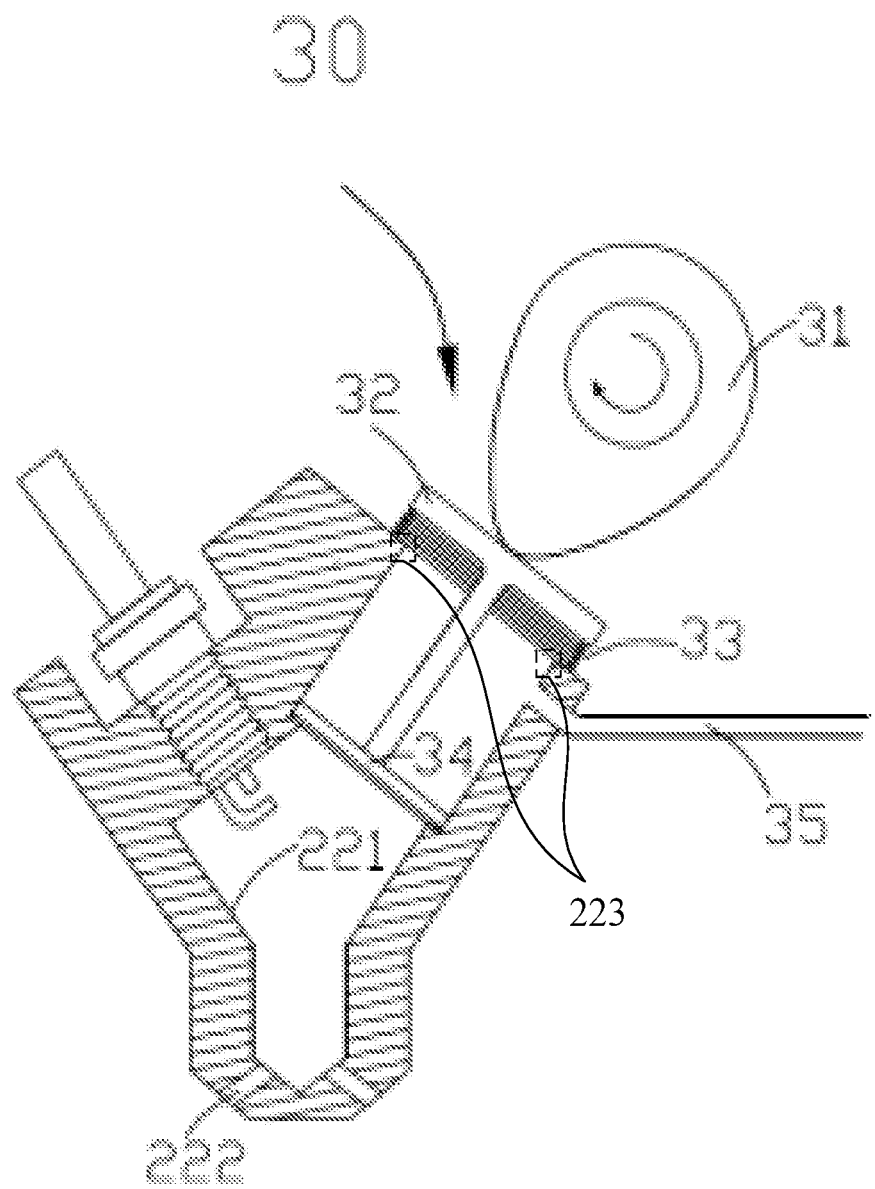
FIG. 4 illustrates a view of the plunger air pump rod at a bottom dead center according to the present application.

Further, as shown in FIGS. 3-4, the pre-combustor housing 22 is further provided with a first contact surface 223 and a second contact surface 224. The first contact surface 223 contacts a lower end of the plunger air pump spring 33 and limits the plunger air pump spring 33, and the second contact surface 224 contacts a lower end of the plunger air pump rod 32 and limits the plunger air pump rod 32. In this embodiment, the first contact surface 223 is provided on an outer wall of the pre-combustor housing 22, and the second contact surface 224 is provided on a step of an inner wall of the pre-combustor housing 22. the locations of the first contact surface 223 and the second contact surface 224 substantially limit a height of the plunger air pump cavity 301.

Figure 2:
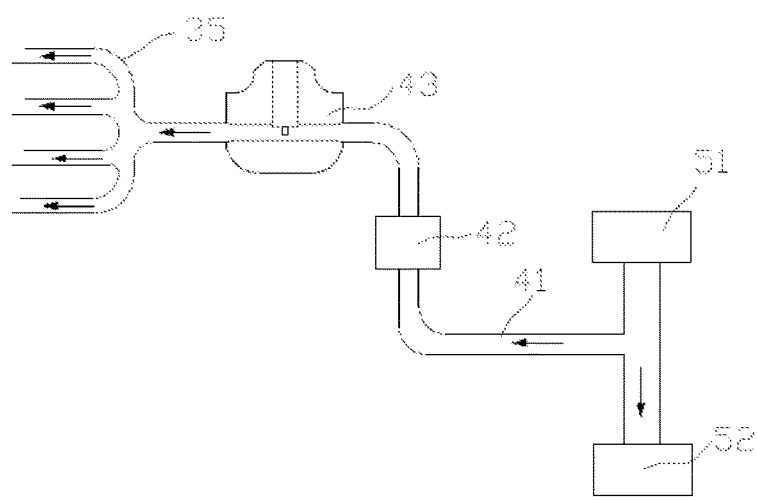
FIG. 2 illustrates a view of a fuel supply pipeline assembly according to the present application.

Referring to FIG. 2 together, In an embodiment, the plunger air pump assembly 30 includes a fuel supply pipeline assembly, and the fuel supply pipeline assembly is communicated with an engine and the plunger air pump cavity 301. The fuel supply pipeline assembly includes a plunger air pump pipeline intake pipe 41, an air compression device 42, a gasification mixing device 43 and a plunger air pump intake pipe 35. An inlet end of the plunger air pump pipeline intake pipe 41 is arranged between an engine air filter 51 and an engine intake pipe 52 (the figure is only schematic). The air compression device 42 and the gasification mixing device 43 are communicated with the plunger air pump pipeline intake pipe 41 through pipelines, and the fuel supply pipeline assembly is communicated with the plunger air pump cavity 301 through the plunger air pump intake pipe 35. The plunger air pump intake pipe 35 is communicated with an outlet end of the plunger air pump pipeline intake pipe 41. In this embodiment, the inlet end of the plunger air pump pipeline air intake pipe 41, that is, an air intake position, is arranged behind the engine air filter, in order to prevent the fresh air entering the plunger air pump cavity 301 from being affected by the EGR. The air compression device 42 may be an electric plunger pump or a Roots pump, because it requires a small air volume and has a low compression ratio. The electric pump is flexible in control and convenient in arrangement, and a crankshaft-driven mechanical pump may also be selected if required. A fuel supply method of the gasification mixing device 43 is may be a Port Fuel Injection (PFI) electronically controlled fuel injector, because of its flexible and accurate fuel quantity control, simple structure and high reliability. A carburetor fuel supply may also be selected if required. The internal mixing device may be a filled steel ball mixing, because this method has a simple structure and high reliability. A mesh mixing may also be selected. A heating method of the gasification mixing device 43 may be an electric heating method, because this device can speed up fuel consumption during cold start, and increase the temperature of the mixed fuel, thereby reducing the difficulty of cold start. If required, other heating methods are used without arranging electric heating related devices according to the actual practical environment. A compression ratio of the air compression device 42 in this embodiment is in a range of 1.5-2.5. An excess air coefficient of the mixed fuel prepared by the gasification mixing device 43 is in a range of 0.6-2.2.

Referring to FIG. 3 and FIG. 4, when the fuel supply system for the active pre-combustor of the present application operates, an upward direction and a downward direction of the plunger air pump rod 32 and the piston 13 are opposite, and the plunger air pump rod 32 always moves in an opposite direction to the piston 13. In an engine compression stage, the piston 13 goes up, and the plunger air pump rod 32 goes down. In an engine intake stage, the piston 13 goes down, and the plunger air pump rod 32 goes up. In a power stroke and exhaust stroke in the engine, the plunger air pump rod 32 is kept stationary or moves in an opposite direction of piston 13 in the main combustor 16 according to practical design requirements. The fresh air flowing into the fuel supply pipeline assembly is firstly pre-pressurized by the air compression device 42 at a constant pressure ratio, and then the fuel and the fresh air are fully mixed by the gasification mixing device 43 according to the required air-fuel ratio. The mixed fuel is finally delivered into the plunger air pump cavity 301 through the plunger air pump intake pipe 35. If the fuel supply system for the active pre-combustor of the present application is used for a vehicle gasoline engine, a diameter of the plunger air pump cavity 301 is in the range of 1-40 mm, and a stroke of the plunger air pump rod 32 is in the range of 1-40 mm. If it is used for a diesel engine, the diameter of the plunger air pump cavity 301 is in a range of 5-500 mm, and the stroke of the plunger air pump rod 32 is in a range of 10-500 mm.

Referring to FIG. 3, when the plunger air pump rod 32 is at a top dead center, the piston 13 is at the lowest point, the plunger air pump pipeline intake pipe 41 is communicated with the pre-combustor cavity 221 through the plunger air pump cavity 301. The mixed fuel mixed by the air compression device 42 and the gasification mixing device 43 can enter the plunger air pump cavity 301 and the pre-combustor cavity 221 through the plunger air pump intake pipe 35.

When the plunger air pump driver 31 drives the plunger air pump rod 32 to go down gradually, the mixed fuel circulates in the plunger air pump cavity 301 and the pre-combustor cavity 221, and is also gradually pressed into the pre-combustor cavity 221 simultaneously. The mixed fuel in the pre-combustor cavity 221 is pressurized and heated.

Referring to FIG. 4, when the plunger air pump rod 32 goes down to a bottom dead center, the piston 13 is at the highest point, and the plunger air pump rod 32 contacts the second contact surface 224 on the pre-combustor housing 22. The plunger air pump piston 34 separates the plunger air pump cavity 301 from the pre-combustor cavity 221, to prevent a backflow of the mixed fuel in the pre-combustor. In this circumstance, the mixed fuel in the pre-combustor cavity 221 is ignited, and the temperature and the pressure in the pre-combustor increase. The high-temperature mixture in the pre-combustor is sprayed to the main combustor 16 at a high speed through the pre-combustor injection holes 222, and rapidly ignites mixed fuel in the main combustor 16.

In the fuel supply system for the active pre-combustor of the present application, a plunger air pump assembly is added to the pre-combustor assembly to deliver mixed fuel to the pre-combustor based on a reciprocating stroke opposite to a piston, which is safe, reliable and efficient. The mixed fuel in the pre-combustor is mixed by a pre-mixing method, making it easier to ensure an equivalence ratio at an ignition position of the pre-combustor, while also avoiding coking and soot formation caused by the excessively rich mixture, and a misfire caused by lean mixture at ignition position. The mixed fuel is prepared outside the pre-combustor, which realizes a partial decoupling of the pre-combustor gas components and the main combustor gas components, thereby solving the problem of the misfire caused by an excessive proportion of residual exhaust gas in a condition of high EGR rate. In addition, since the high-pressure mixed fuel in the present application is prepared when it is in need. On the one hand, the high-pressure gas storage device is omitted, the cost is reduced, and the risk of leakage of the high-pressure mixed fuel is reduced. On the other hand, since the temperature of the mixed fuel is increased after compression, the ignition stability is improved and the difficulty of cold start is also reduced.

Described above are only specific embodiments of the present application, but the protection scope of the present application is not limited thereto. Any changes or substitutions that any person skilled in the art can easily think of within the technical scope disclosed by the present application should be covered within the protection scope of the present application. Therefore, the protection scope of the present application should be based on the protection scope of the claims.

What is claimed is:

1. A fuel supply system for an active pre-combustor, comprising:
   a main combustor, comprising:
     a cylinder head;
     a cylinder body; and
     a piston;
   a pre-combustor assembly; and
   a plunger air pump assembly;
   wherein the pre-combustor assembly is communicated with the main combustor, and the plunger air pump assembly is communicated with the pre-combustor assembly, and wherein the plunger air pump assembly is capable of mixing air and fuel into mixed fuel and delivering the mixed fuel to the pre-combustor assembly;
   wherein the plunger air pump assembly comprises a plunger air pump driver, a plunger air pump rod and a plunger air pump spring, wherein the plunger air pump driver is configured to drive the plunger air pump rod, and the plunger air pump spring is wound on the plunger air pump rod, so that the plunger air pump rod is capable of sliding up and down in a plunger air pump cavity under a driving of the plunger air pump driver;
   wherein the plunger air pump assembly further comprises a fuel supply pipeline assembly, which is communicated with an engine and the plunger air pump cavity, wherein the fuel supply pipeline assembly comprises a plunger air pump pipeline intake pipe, an air compression device and a gasification mixing device, wherein an inlet end of the plunger air pump pipeline intake pipe is arranged between an engine air filter and an engine intake pipe, and the air compression device and the gasification mixing device are communicated with the plunger air pump pipeline intake pipe through pipelines.

2. The fuel supply system for the active pre-combustor of claim 1, wherein the pre-combustor assembly comprises a spark plug and a pre-combustor housing, wherein the spark plug is fixed on the pre-combustor housing, and the spark plug is capable of igniting the mixed fuel in the pre-combustor housing, and wherein the pre-combustor housing is provided with pre-combustor injection holes, and the pre-combustor assembly is communicated with the main combustor through the pre-combustor injection holes.

3. The fuel supply system for the active pre-combustor of claim 2, wherein the pre-combustor housing is communicated with the plunger air pump cavity.

4. The fuel supply system for the active pre-combustor of claim 3, wherein the plunger air pump rod is capable of controlling the plunger air pump cavity to be communicated with or separated from the pre-combustor cavity.

5. The fuel supply system for the active pre-combustor of claim 2, wherein the pre-combustor housing is further provided with a first contact surface and a second contact surface, wherein the first contact surface contacts a lower end of the plunger air pump spring and limits the plunger air pump spring, and the second contact surface contacts a lower end of the plunger air pump rod and limits the plunger air pump rod.

6. The fuel supply system for the active pre-combustor of claim 1, wherein when the fuel supply system for the active pre-combustor is used for a gasoline engine, a diameter of the plunger air pump cavity is in a range of 1-40 mm, and a stroke of the plunger air pump rod is in a range of 1-40 mm, wherein when the fuel supply system for the active pre-combustor is used for a diesel engine, the diameter of the plunger air pump cavity is in a range of 10-500 mm, and the stroke of the plunger air pump air rod is in a range of 5-500 mm.

7. The fuel supply system for the active pre-combustor of claim 1, wherein the fuel supply pipeline assembly further comprises a plunger air pump intake pipe, wherein the fuel supply pipeline assembly is communicated with the plunger air pump assembly through the plunger air pump intake pipe, and the plunger air pump intake pipe is communicated with an outlet end of the plunger air pump pipeline intake pipe.

8. The fuel supply system for the active pre-combustor of claim 1, wherein a ratio of a frequency at which the plunger air pump driver drives the plunger air pump rod and a frequency at which the piston drives an engine crankshaft is 1:2.

9. The fuel supply system for the active pre-combustor of claim 1, wherein a ratio of a frequency at which the plunger air pump driver drives the plunger air pump rod and a frequency at which the piston drives an engine crankshaft is 1:1 or 2:1.

10. The fuel supply system for the active pre-combustor of claim 1, wherein the plunger air pump rod further comprises a plunger air pump piston, wherein the plunger air pump piston is fixedly connected to a bottom end of the plunger air pump rod and is directly driven by plunger air pump rod, which is capable of sliding up and down in the plunger air pump cavity under the driving of the plunger air pump driver and a driving of the plunger air pump spring.

11. The fuel supply system for the active pre-combustor of claim 2, wherein the pre-combustor injection holes are arranged at a bottom of the pre-combustor housing, and the plurality of pre-combustor injection holes are evenly arranged along an axis of the pre-combustor housing; the spark plug is arranged on one side of a top of the pre-combustor housing, and the plunger air pump assembly is arranged on the other side of the top of the pre-combustor housing.

12. The fuel supply system for the active pre-combustor of claim 5, wherein the first contact surface is provided on an outer wall of the pre-combustor housing, and the second contact surface is provided on a step of an inner wall of the pre-combustor housing.

13. The fuel supply system for the active pre-combustor of claim 1, wherein an inlet end of the plunger air pump pipeline air intake pipe is arranged behind the engine air filter.

14. The fuel supply system for the active pre-combustor of claim 1, wherein the air compression device is an electric plunger pump or a Roots pump.

15. The fuel supply system for the active pre-combustor of claim 1, wherein a heating method of the gasification mixing device is an electric heating method.

16. The fuel supply system for the active pre-combustor of claim 1, wherein a compression ratio of the air compression device is in a range of 1.5-2.5, and an excess air coefficient of the mixed fuel prepared by the gasification mixing device is in a range of 0.6-2.2.

* * * * *